Aug. 30, 1966 C. A. STRAND 3,269,076
LAMINATED PANELS FOR BUILDING CONSTRUCTION
Filed Nov. 18, 1963 3 Sheets-Sheet 1

INVENTOR.
CARL A. STRAND
BY Cullen, Sloman & Cantor
ATTORNEYS

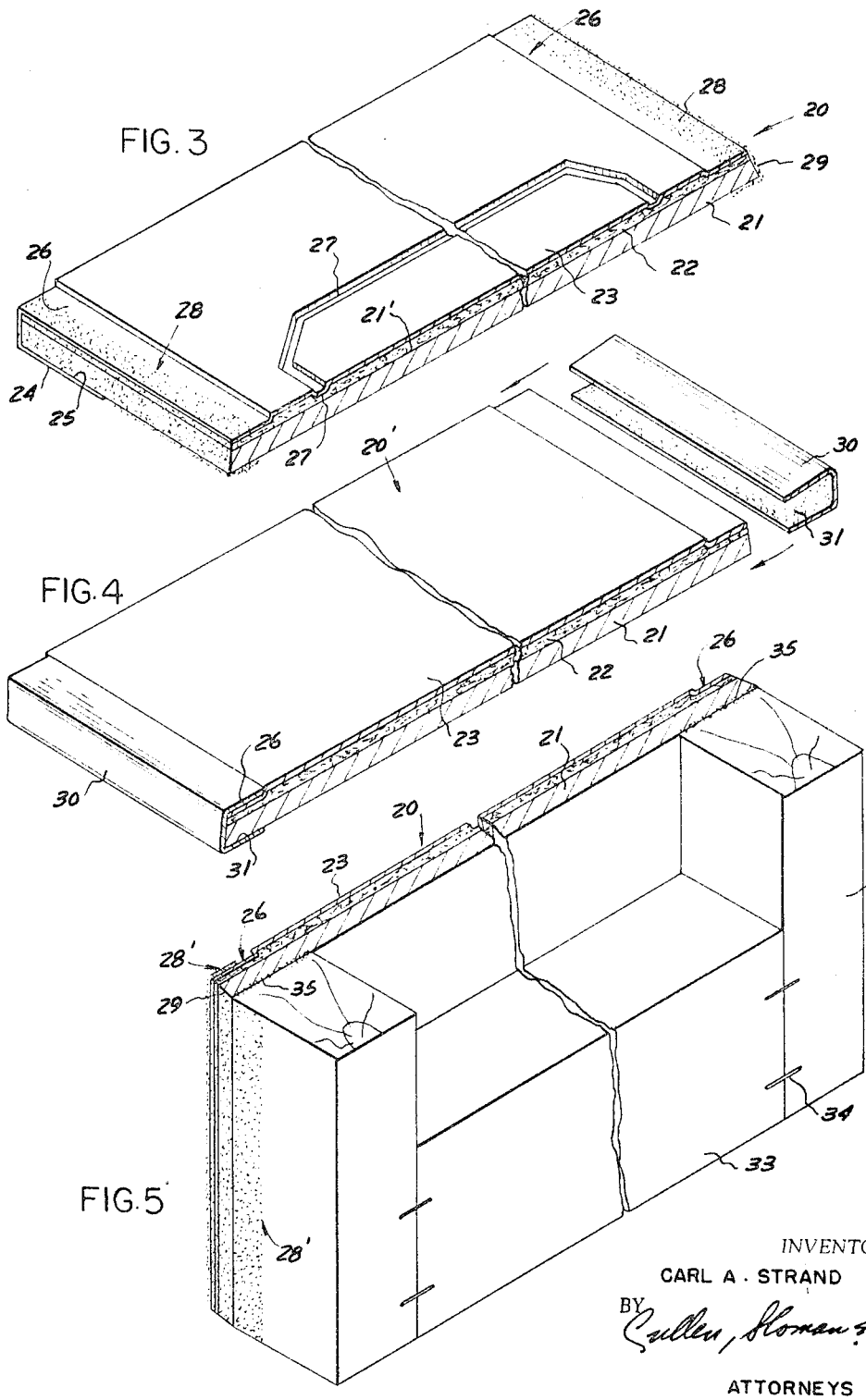

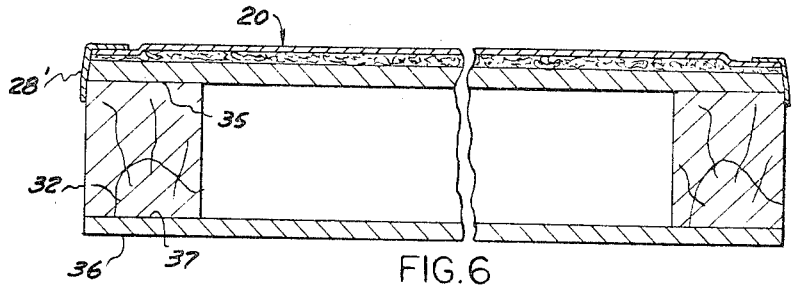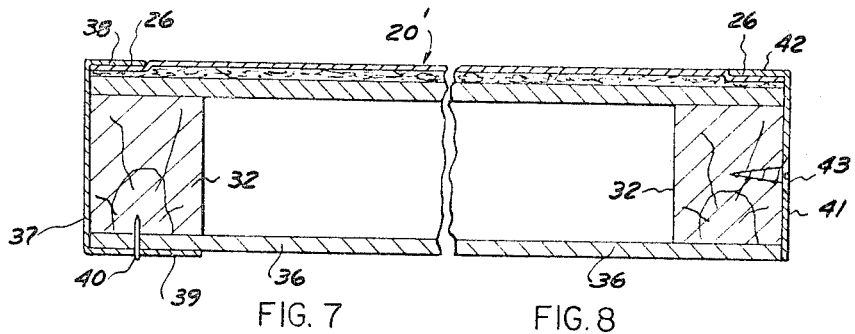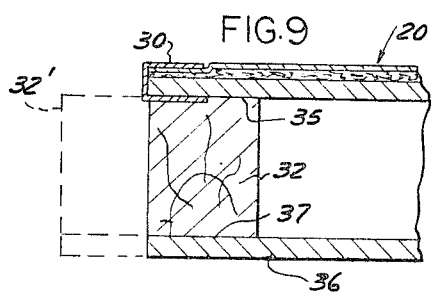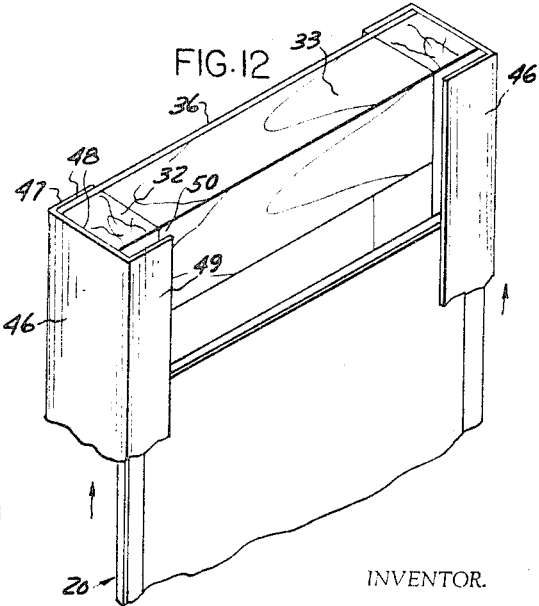

United States Patent Office 3,269,076
Patented August 30, 1966

3,269,076
LAMINATED PANELS FOR BUILDING
CONSTRUCTION
Carl A. Strand, 3341 N. Adams Road, Birmingham, Mich.
Filed Nov. 18, 1963, Ser. No. 324,491
6 Claims. (Cl. 52—623)

The present invention relates to laminated panels particularly useful in the building construction industry.

It is an object of the present invention to provide a laminated panel which consists of a hard board or fiber board backing layer, a layer of resilient padding and an outer vinyl plastic or other cover peripherally and otherwise bonded to said backing and which may be used for a variety of purposes, primarily directed to buildings and home construction.

It is another object to provide a novel panel assembly which during the welding or bonding operation provides an attractive unusual appearance, particularly adapted for doors in building constructions as a sub-assembly, or as a unit part thereof.

It is another object to incorporate the present laminated panel into a closet door construction, though not limited thereto, and particularly to closet doors of the folding type for illustration. The present laminated panel may be incorporated into and associated with a framework of a door or other frame and wherein means are provided to prevent delamination of the plastic covering.

It is another object to provide a novel door construction or frame assembly incorporating the present panel, wherein said panel is removable and interchangeable with other panels of different designs or colors.

These and other objects and advantages will be seen from the following specification and claims in conjunction with the appended drawings in which:

FIG. 3 is a fragmentary perspective partly sectioned view of a basic panel assembly.

FIG. 4 is a similar view including channel moldings.

FIG. 5 is a fragmentary view of a lower portion of a door panel, such as shown in FIGS. 1 and 2 incorporating the panel of FIG. 3, partly broken away and sectioned.

FIG. 6 is a partly broken-away horizontal section of the panel assembly shown in FIG. 5, but with a closure panel across the rear of the frame.

FIG. 7 is a similar view including a marginal channel molding.

FIG. 8 is a similar view including an L-shaped molding.

FIG. 9 is a fragmentary horizontal section of a panel and frame assembly incorporating the panel shown in FIG. 4.

FIG. 10 is a fragmentary perspective view of a panel and frame assembly similar to FIG. 7.

FIG. 11 is a plan view of the channel molding of FIG. 10, before assembly.

FIG. 12 is a fragmentary perspective view of a frame construction with removable panel.

It will be understood that the above drawings illustrate merely preferred embodiments of the invention, and that other embodiments are contemplated within the scope of the claims hereafter set forth.

Figure 1:
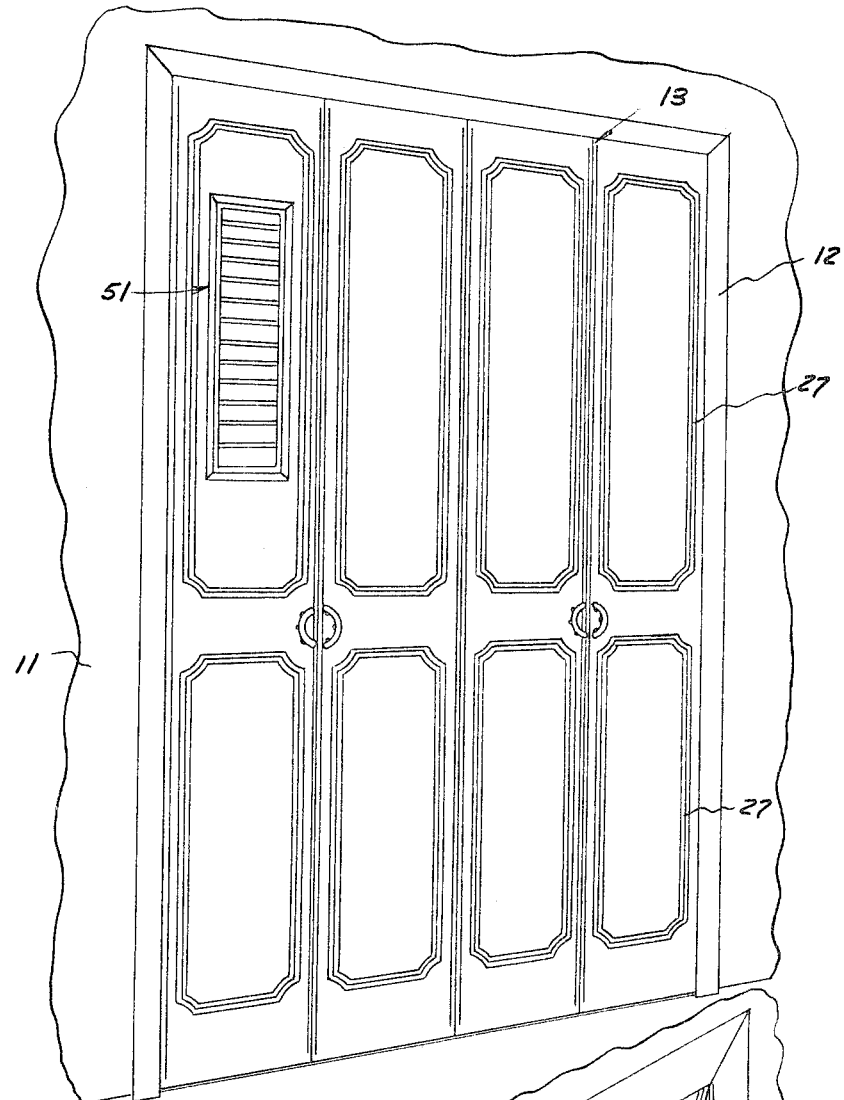
FIG. 1 is a perspective view of a pair of folding closet doors illustrating one usage of the present panel.
Figure 2:
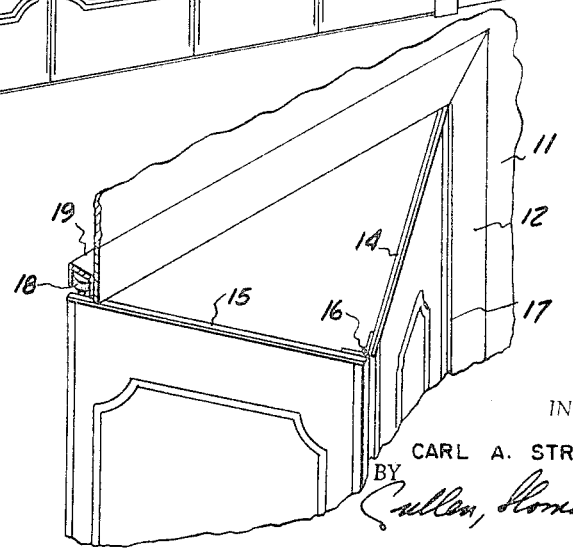
FIG. 2 is a fragmentary perspective view partly broken away, illustrating one of the folding doors partly opened.

Referring to the drawing, FIGS. 1 and 2 illustrate one form of use for the present panel assembly in a building construction, as for example, a house. Frame 12 in wall 11 of a building in the illustrative embodiment, is for a closet incorporating pairs of folding doors 13. Each pair of doors includes panels 14 and 15 hinged together at 16.

Outer panel 14 is hinged adjacent its edge at 17 to frame 12. The outer edge portion of panel 15 is guidably mounted within frame 11 employing roller or other guide 18 movably positioned within channel 19 associated with frame 12 in a conventional manner.

The present panel is incorporated into folding door elements 14 and 15 for a closet, as illustrative of one embodiment of the invention but not limited thereto.

Panel assembly

The basic panel is adapted for a plurality of usages such as for folding closet doors, FIG. 1, or for attachment to existing doors for improving the appearance thereof, or for other purposes relating to the building industry.

Referring to FIG. 3, panel 20 includes elongated hardboard backing 21 which may be rectangular, circular, octagon, or any shape as desired. The word "hardboard" as generally known to the trade is intended to include various boards available on the market. Some of these are made employing sawdust and a resin normally rolled or pressed into a flat rectangular and thin hardboard. This may be referred to, for illustration, as 100 point hardboard being approximately one-eighth of an inch in thickness, though not limited thereto. Other materials of a similar nature can be employed for the backing other than hardboard, as for example, a fiber board which consists of laminated paper or other material which has been hard pressed or rolled into board form.

In the discussion hereinafter with respect to reference to the word "hardboard" it is intended as equivalent thereto to include any of the hardboard or similar boards available on the market known either as "hardboard" or "fiber board" or the like.

In the illustrative embodiment, FIG. 3, hardboard backing 21 is of elongated rectangular shape, and has thereover a layer of resilient padding 22 of a synthetic fiber normally impregnated with a vinyl resin or the like. The vinyl resin or other resin impregnated into the padding is of a form compatible with the outer vinyl plastic cover 23. Said padding may be purchased upon the open market. One firm which supplies this material is Sterns & Foster Company of New York; and the material is known by their trademark "Fibrebond." Said backing has applied thereto on one surface as at 21' a layer or coating of a vinyl material of limited thickness compatible with vinyl cover 23.

The basic panel 20 includes backing 21, coating 21', padding 22, and outer vinyl plastic cover 23 which is juxtaposed over said backing and padding and extends to the marginal edges thereof. Top and bottom portions of cover 23 extend respectively over the top and bottom edges of backing 21 as at 24, FIG. 3, and are secured thereto by suitable adhesive as at 25.

The plastic covering, preferably a vinyl plastic, is of a twelve mill thickness, for illustration, which thickness can be varied according to needs of the user. One form of adhesive 25, is glue sold by Perm Elastic Corporation of Detroit, Michigan, and is identified by the Product No. PX 1347, and is in the nature of a fast drying contact adhesive.

The laminated panel of FIG. 3 is completed by a conventional heat and pressure welding operation which connects interior portions of plastic cover 23 to adjacent portions of backing 21 with pading 22 at said welded portions compressed therebetween.

In the welding operation, the heat and pressure fuses the resin impregnated within the backing to provide an intimate bond between the vinyl coated surface of backing 21, and vinyl cover 23.

Normally the sealing or welding operation is accomplished with suitable dies using heat and pressure, and wherein unusual design appearances are produced in the outer surface of the panel, as shown in FIG. 1. Thus weld 27 FIG. 3, is primarily for adhering the outer decorative cover 23 of the panel to its backing 21.

Said welding operation includes the elongated bar line welds 26 which extend along the outer edges of cover 23 and are of appreciable width, 3/8" to 1/2", for fixedly securing outer edge portions of cover 23 over corresponding edge portions of backing 21 with the adjacent padding 22 compressed therebetween. The bar lines 26 prevent delamination of edge portions of cover 23.

This basic panel assembly may have a variety of usages either by itself or incorporated with other building structures.

Edge hardening

A continuous layer 28 of a suitable lacquer, which may be pigmented as desired, is applied to and over outer edge portions or cover 23 and extending over edge portions of backing 21 for the purpose of edge hardening the panel and for protecting the edges of the cover against delamination.

Where panels 20 of the type shown in FIG. 3 are incorporated into a folding closet door construction, for example, as shown in FIG. 1, the outer marginal edges of the backing 21 are tapered as at 29 to provide clearance when a pair of adjacent panel elements are folded together.

The number 27 in FIGS. 1 and 3 merely shows one form of ornamentation weld which may be applied to cover 23. Said weld serves the additional function of securing intermediate portions of said cover to the backing. Many suitable designs may be employed to render the door or other panel assembly more attractive. Cover 23 may come in any number of desired colors to fit the motif of a particular room.

Modified panel

FIG. 4 shows a modified panel 20' of the same construction as unit panel 20 of FIG. 3, but includes the addition of the formed preferably plastic marginal channels 30 which are projected over and along outer edge portions of the backing 22 and cover 23. These channels may extend over merely the side edges of the panel or may extend peripherally around the panel. The channels may be of an extruded plastic material, as for example, a polyvinyl chloride, polystyrene, or others and may be coated upon its interior surface with a suitable adhesive 31 to facilitate securing of the channel over marginal portions of the panel assembly.

The legs of channels 30 are slightly converging as originally formed and are sprung during the assembly over marginal portions of the panel. With or without adhesive 31, said channels compressively engage marginal portions of the panel for maintaining an assembled relationship.

Such a panel 20', FIG. 4, could be mounted, for illustration, upon an existing door to modify its appearance or to improve the appearance of an old worn-out door or for other purposes. In the panel 20', FIG. 4, the edge hardening 28 of FIG. 3 can be omitted if desired since channels 30 protect cover 23 from delamination at its edges.

Panel frame assembly

The basic panel 20 of FIG. 3 may be applied to any suitable frame, as for example, a door frame which includes interconnected rails and styles 32 and 33 secured together at 34.

Hollow rectangular frame 32–33 supportably bears against and along rear edge and intermediate portions of panel assembly 20 and is suitably secured thereto as by gluing at 35 using any suitable adhesive available on the market such as the adhesive above described at 25, FIG. 3.

Edge portions of the panel and frame are hardened to prevent delamination by the application of a layer 28' of a pigmented lacquer. This layer extends over outer marginal portions of cover 23 along bar line 26, over adjacent side edge portions of backing 21 and over adjacent portions of the framework.

Panel frame assembly and closure

FIG. 6 is a similar construction to that shown in FIG. 5 except that it has a closure panel 36, preferably of hard board or fiber board, though not limited thereto. Panel 36 is mounted over the rear open side of frame 32–33 and adhesively or otherwise secured thereto as at 37 to provide a completed door or panel frame assembly.

Panel frame assembly with moldings

Modification is fragmentarily shown in FIG. 7, wherein the edge hardening lacquer 28' of FIGS. 5 and 6 may be omitted. In its place there is provided along the marginal edge portions of the assembly a plastic channel 37 preferably of a polyvinyl chloride which is strong and resilient. The respective legs 38–39 of the channel before assembly converge towards each other and must be sprung outwardly in assembly. Thus, channel 37 is substantially self-securing.

In the illustrative embodiment, FIG. 7, staples or other fasteners 40 are applied to the channel through rear backing 36 as a further means fixedly securing the channels. The shorter front leg 38 of channel 37 engages bar line 26 and the wider rear leg 39 engages the rear surface of closure 36. This channel may extend peripherally around the complete assembly or may extend merely along the opposed side edges thereof.

Modified edging

A slightly different form of edging in the form of a plastic angle member 41 may be employed, FIG. 8, which bears against side edges of panel 20' and frame 32 throughout its depth and including backing board 36, and is secured to the frame by fasteners 43. The short leg 42 of the angle member cooperatively bears against the front edge of plastic cover 23 along bar line 26 protecting the panel assembly against delamination. Angle member 41 is preferably constructed of a plastic material such as polyvinyl chloride. Angle 41 may extend along the opposed side edges of the assembly or peripherally there around as desired.

Modified channel

The construction shown in FIGS. 7 and 8 is slightly modified in the fragmentary perspective view of FIG. 10. Here the channel members 44 are of U-shape, after having been sprung from the normal converged shape shown in FIG. 11.

These channels preferably made of polyvinyl chloride, for example, are hard, strong and resilient.

Legs 45 are sprung outwardly against the inherent resiliency of the material so as to compressively and retainingly grip the marginal edge portions of the panel assembly as shown in FIG. 10. Adhesive can be employed, if desired, such as above described at 31 in FIG. 4.

In FIG. 10, the modified panel 20' of FIG. 4 is employed with channels 30 replaced by plastic channels 44. These extend along the marginal edges. Thus, it is not necessary to provide the edge hardening layer of lacquer 28 shown in FIG. 3 of panel 20.

Modified panel frame assembly

The panel 20' of FIG. 4 is shown in an application to a frame 32 in FIG. 9 and wherein the frame is secured to rear portions of the panel and to portions of the closure element 36 by adhesive 35, 37. Channel moldings 30 may be of any desired color. The framework may be an existing door 32' for modifying its appearance or for providing an improved door assembly.

Interchangeable panel frame assembly

Referring to FIG. 12 and with respect to a framework 32–33, similar to that shown in FIG. 5, there is applied to the outer marginal edges thereof the opposed elongated continuous plastic channels 46, preferably constructed of polyvinyl chloride. The respective rear and front legs 47 and 49 are normally parallel and are not converging as is channel 44 of FIG. 11.

Rear legs 47 of the channels 46 are secured to rear portions of frame 32–33 using a suitable glue or adhesive as at 48.

The front legs 49 of the channels are spaced forwardly of front portions of the frame to define a pair of opposed elongated slots 50. Panel 20 is slidably positioned and secured within slots 50. Panel 20 which may be removed as desired and replaced should the user desire to change colors or designs in the panel employed or for repair.

Bar line 26, FIG. 3, is of appreciable width. It is produced under heat and pressure for the purpose of densifying, sealing and hardening the three components adequately so that fraying and delamination will not occur in these critical areas.

In the illustrative embodiment, FIG. 1, incorporating the present panels as applied to folding closet doors, one or more mirrors could be applied to the exterior as desired.

The doors may be of a plain imperforate form or may include louvre assemblies 51. Here a conventional louvered frame assembly is mounted within the framework of the door and secured therein. Accordingly, and to this extent the panel shown in the drawings may be modified.

Having described my invention, reference should now be had to the following claims.

I claim:
1. In a door construction, a hollow rectangular frame including interconnected rails and stiles; and
  a laminated panel overlying the face of said frame and secured thereto; the panel comprising:
  an elongated hardboard backing;
  a layer of resilient padding of the same shape impregnated with a fusible resin and overlying said backing;
  an outer vinyl plastic cover juxtaposed over said backing and padding and extending to the marginal edges thereof; and
  an elongated barline weld extending along the outer side edges of said cover, of appreciable width, heat and pressure bonded through said padding to adjacent portions of the backing with the padding compressed therebetween.

2. In the door construction of claim 1, and a formed plastic channel snugly and compressively projected over and along outer side edge portions of said panel and frame.

3. A laminated panel comprising:
  an elongated hardboard backing;
  a vinyl coating on said backing;
  a layer of resilient padding of the same shape as said backing impregnated with a fusible resin and overlying said backing and vinyl coating;
  an outer vinyl plastic cover juxtaposed over said padding and extending to the marginal edges thereof;
  an elongated barline weld of appreciable width extending along the outer side edges of said cover, said weld creating a heat and pressure bond through said padding to adjacent portions of said backing and said vinyl coating, with said padding being compressed therebetween, the compression of the panel due to said barline weld creating a depressed border around the edges of said cover;
  a frame in the form of inter-connected rails and stiles supportedly bearing against and along rear edge portions of said backing and secured thereto;
  and a formed plastic U-shaped channel snugly and compressedly projected over and along the outer side edge portions of said cover and said frame, the front leg of said channel overlapping said depressed border of said cover, thereby producing a substantially flush front face to said panel.

4. A laminated panel comprising:
  an elongated hardboard backing;
  a layer of resilient padding of the same shape impregnated with a fusible resin and overlying said backing;
  an outer vinyl plastic cover juxtaposed over said backing and padding and extending to the marginal edges thereof;
  an elongated barline weld extending along the outer side edges of said cover, of appreciable width, heat and pressure bonded through the padding to adjacent portions of the backing with the padding compressed therebetween;
  and a formed plastic channel snugly projected over and along outer edge portions of said backing and cover and secured thereto.

5. A laminated panel comprising:
  an elongated hardboard backing;
  a layer of resilient padding of the same shape impregnated with a fusible resin and overlying said backing;
  an outer vinyl plastic cover juxtaposed over said backing and padding and extending to the marginal edges thereof;
  an elongated barline weld extending along the outer side edges of said cover, of appreciable width, heat and pressure bonded through the padding to adjacent portions of the backing with the padding compressed therebetween;
  and a hollow rectangular frame in the form of interconnected rails and stiles supportably bearing against and along rear edge portions of said backing and secured thereto.

6. A laminated panel comprising:
  an elongated hardboard backing;
  a layer of resilient padding of the same shape impregnated with a fusible resin and overlying said backing;
  an outer vinyl plastic cover juxtaposed over said backing and padding and extending to the marginal edges thereof;
  an elongated barline weld extending along the outer side edges of said cover, of appreciable width, heat and pressure bonded through the padding to adjacent portions of the backing with the padding compressed therebetween;
  a hollow rectangular frame in the form of interconnected rails and stiles supportably bearing against and along rear edge portions of said backing and secured thereto; and
  a closure panel juxtaposed over and peripherally secured to said frame.

References Cited by the Examiner

UNITED STATES PATENTS

| | | | |
|---|---|---|---|
| 1,806,637 | 5/1931 | McGavic | 20—36 |
| 2,227,150 | 12/1940 | Olston | 52—623 X |
| 2,504,874 | 4/1950 | Prance | 52—622 X |
| 2,578,709 | 12/1951 | Lyijynen | 161—41 |
| 2,582,467 | 1/1952 | Sylvan | 52—623 |
| 2,616,823 | 11/1952 | Weymouth | 161—41 X |
| 2,636,189 | 4/1953 | Feldman | 52—627 X |
| 2,743,890 | 5/1956 | Hobbs | 52—623 |
| 2,791,809 | 5/1957 | Lincoln | 20—35 |

HARRISON R. MOSELEY, *Primary Examiner.*

P. C. KANNAN, *Assistant Examiner.*